United States Patent
Mann et al.

(10) Patent No.: US 7,448,639 B1
(45) Date of Patent: Nov. 11, 2008

(54) FIFTH WHEEL MOUNTING BRACKET

(75) Inventors: Steven William Mann, Gardendale, AL (US); Jeff Marcus Terry, Birmingham, AL (US); James Matthew Rhodes, Pelham, AL (US); Christopher Aaron Bond, Pinson, AL (US)

(73) Assignee: Fontaine International, Irondale, AL (US)

( * ) Notice: Subject to any disclaimer, the term of this patent is extended or adjusted under 35 U.S.C. 154(b) by 370 days.

(21) Appl. No.: 11/296,925

(22) Filed: Dec. 8, 2005

(51) Int. Cl.
B62D 53/08 (2006.01)
(52) U.S. Cl. ................................... 280/441.1
(58) Field of Classification Search .......... 280/433, 280/438.1, 441.1
See application file for complete search history.

(56) References Cited

U.S. PATENT DOCUMENTS

| | | | |
|---|---|---|---|
| 3,106,382 A * | 10/1963 | Georgi | 254/419 |
| 3,220,612 A * | 11/1965 | Thomson | 222/166 |
| 4,960,288 A | 10/1990 | Chambers | |
| 5,765,849 A | 6/1998 | Moulton et al. | |
| 6,220,794 B1 * | 4/2001 | Calamia et al. | 407/40 |
| 6,488,305 B2 | 12/2002 | Laarman | |
| 6,736,420 B2 | 5/2004 | Laarman et al. | |
| 7,108,274 B2 | 9/2006 | Laarman | |
| 7,140,633 B2 | 11/2006 | Audo et al. | |
| 7,210,255 B2 * | 5/2007 | Blackburn | 40/209 |
| 2003/0047906 A1 * | 3/2003 | Hicks et al. | 280/433 |

* cited by examiner

*Primary Examiner*—Kevin Hurley
(74) *Attorney, Agent, or Firm*—Lanier Ford Shaver Payne P.C.; George P. Kobler; J. Mark Bledsoe

(57) ABSTRACT

A fifth wheel mounting bracket is provided. Said mounting bracket allows for the transfer of the load placed on the hitch plate through the mounting pin rather than through its contact surface with the saddle bearing of the hitch plate.

4 Claims, 4 Drawing Sheets

FIFTH WHEEL MOUNTING BRACKET

BACKGROUND

1. Field

The present invention relates generally to fifth wheel assemblies for coupling semi-trailers to tractors. More particularly the invention relates to a fifth wheel mounting bracket.

2. Description of the Related Art

Large highway freight trailers are usually coupled to an associated tractor by means of a fifth wheel assembly. The fifth wheel assembly, located about the longitudinal axis of the tractor frame between the rear drive wheels and the front steering system, often contains a mounting bracket and a fifth wheel. The fifth wheel is pivotally coupled to the mounting bracket by a mounting pin which is inserted from the lateral exterior of the fifth wheel assembly through the fifth wheel and mounting bracket.

Traditionally fifth wheel mounting brackets have relied on contact between an arched surface on the upper portion of the mounting bracket and a mating surface in the saddle bearing of the fifth wheel to transfer the load from the fifth wheel to the mounting assembly. A plastic bracket liner is captured between these two surfaces and acts as a sacrificial wear item. This type of mounting arrangement requires a relatively large surface contact area between the mounting bracket and saddle bearing to prevent excessive wear in the plastic bracket liner. The fifth wheel mounting pin that is inserted through the fifth wheel/mounting bracket/rubber busing connection carries only a minor load during normal operation. The only time the mounting pin carries a significant load is during an accident situation.

SUMMARY

The present disclosure is directed to provide a fifth wheel mounting bracket that does not rely on mating surfaces to transfer the load between the fifth wheel and mounting bracket. The load is transferred through the mounting pin, which is inserted through a busing or bearing in the mounting bracket.

Any number of bushings or bearings can be used in the mounting bracket, including but not limited to bronze bushing, composite bushing, ball bearing, roller bearing, and spherical bearings. Because the bushing or bearing is more efficient at carrying the imposed load, the relatively large mating surfaces between the mounting bracket and the fifth wheel can be eliminated. The result is a more compact, lighter weight mounting bracket. The fifth wheel can also be made narrower and with less structure in the saddle bearing areas, resulting in a more compact, lighter weight fifth wheel. By using lubricated and sealed bearings, the need to lubricate this joint is eliminated. It also eliminates the need for the plastic bracket liner and the two-piece rubber bushing.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

The fifth wheel mounting bracket can be made of any material suitable for the uses described herein, including but not limited to steel, ductile iron, aluminum, or composites.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 6 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
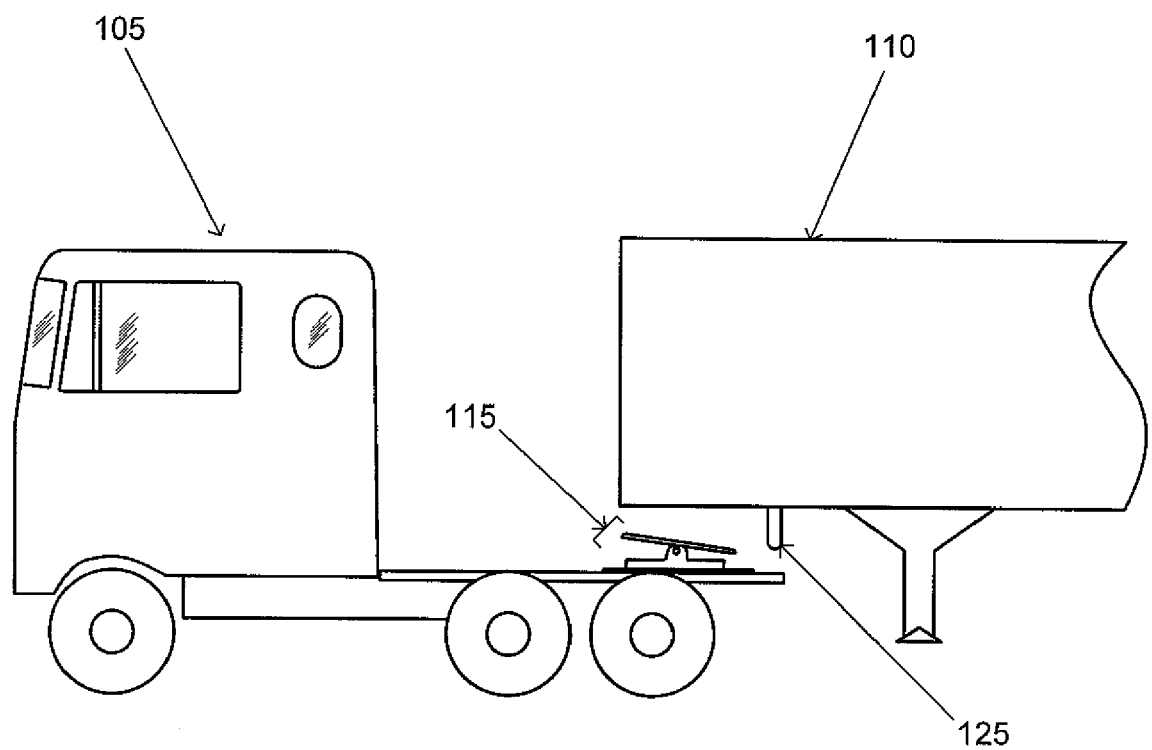
FIG. 1 is an exemplary towing vehicle and trailer to depict general operation of a fifth wheel hitch assembly.
Figure 2:
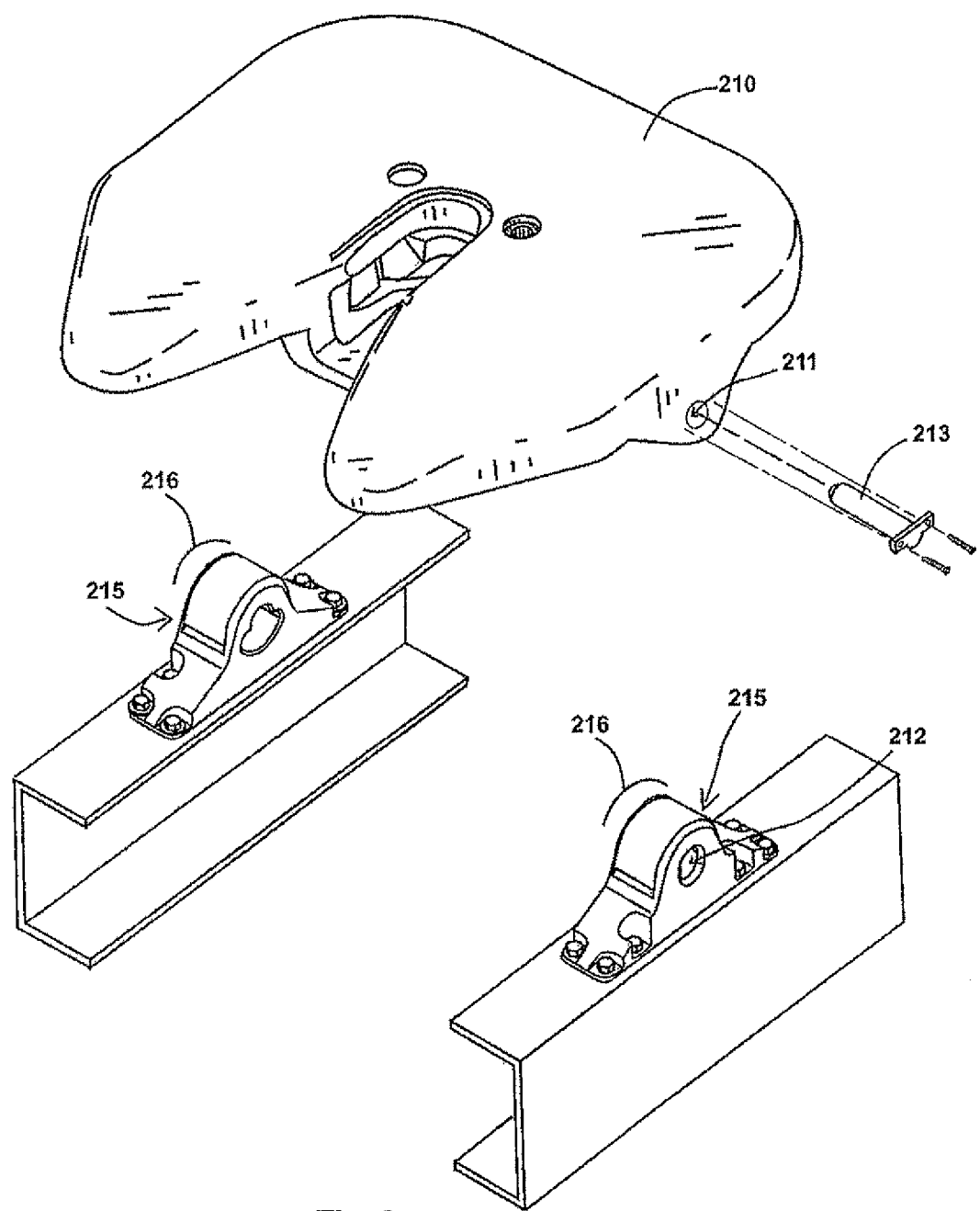
FIG. 2 is a perspective view of a traditional fifth wheel assembly.

A tractor 105 is attached to a trailer 110 by means of a fifth wheel assembly 115 attached to the tractor 105, which mates with a king pin 125 located on the trailer 110. As shown in FIG. 2, a traditional fifth wheel assembly typically comprises a hitch plate 210 which rests upon mounting brackets 215. The hitch plate 210 is secured to the mounting brackets 215 by a mounting pin 213 inserted through a hole 211 in the exterior of the hitch plate 210 and a corresponding hole 212 in the mounting bracket 215. In traditional fifth wheel assemblies, the load of the trailer is transferred to the tractor from the hitch plate through the contact surface 216 of the mounting brackets. In order to handle the forces imposed by the load, the mating surface of the saddle bearing of the hitch plate and the contact surface 216 of the mounting brackets tend to be rather large.

Figure 3:
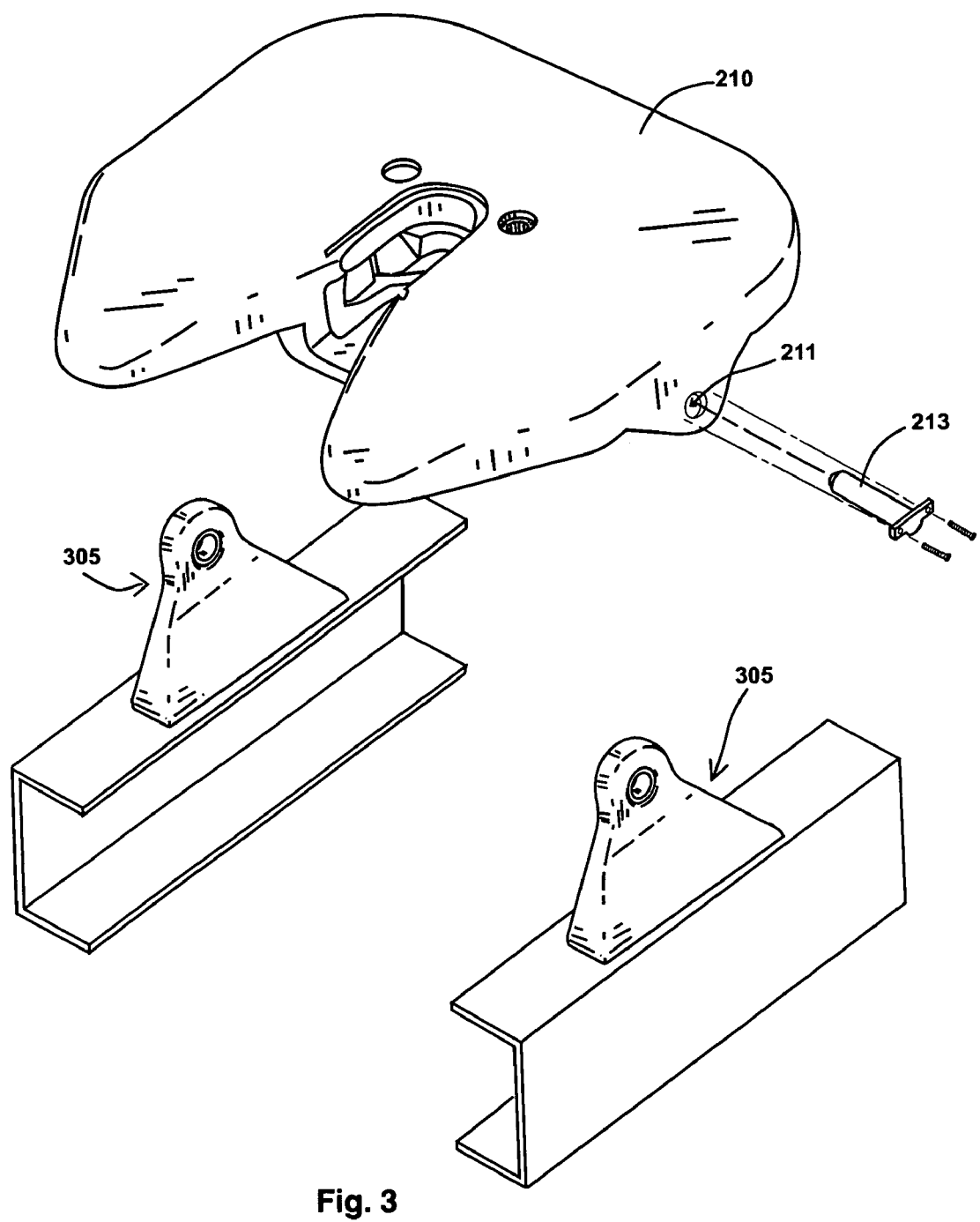
FIG. 3 is a perspective view of a fifth wheel assembly incorporating an exemplary mounting bracket.

According to the present invention, the preferred embodiment of the mounting bracket 305 of FIG. 3 is thinner and is designed to transfer the load placed on the hitch plate through the mounting pin. This reduces the need of a large contact surface between the mounting bracket and the saddle bearing, allowing for a reduction in the size and weight of the mounting bracket, as well as the associated hitch plate.

Figure 4:
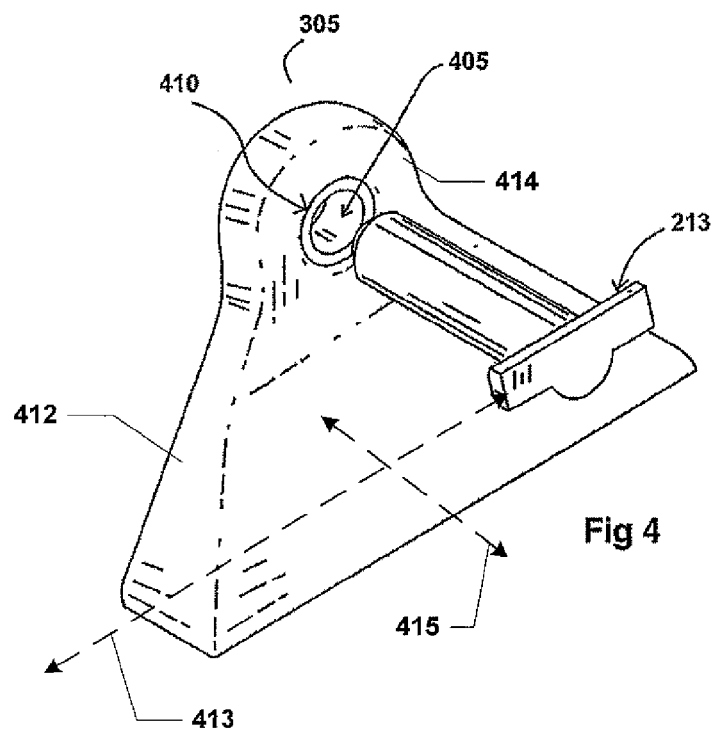
FIG. 4 is a perspective view of an exemplary fifth wheel mounting bracket according to the present invention and its associated mounting pin.
Figure 6:
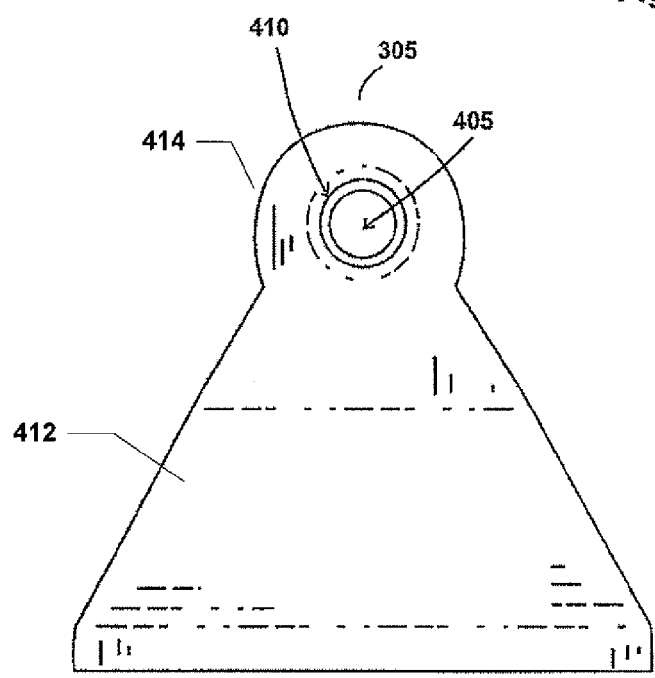
FIG. 6 is a front view of a traditional fifth wheel mounting bracket.

As shown in FIGS. 4 and 6, the mounting bracket 305 is a generally pyramidal solid base 412 having a generally rounded apex 414. The base portion 412 has a longitudinal axis 413 that, when the bracket is properly installed in the fifth wheel assembly, is parallel to the longitudinal axis of the tractor. There is a generally cylindrical opening or bore 405 defined within the generally rounded apex 414, disposed parallel to an axis 415 perpendicular to the longitudinal axis 413, and which receives the mounting pin 213. A bronze bushing 410 can be placed within the opening in order to reduce friction between the mounting pin 213 and the mounting bracket 305. Composite bushings, ball bearings, roller bearings, or spherical bearings, all known in the arts, can also be used for this purpose.

Figure 5:
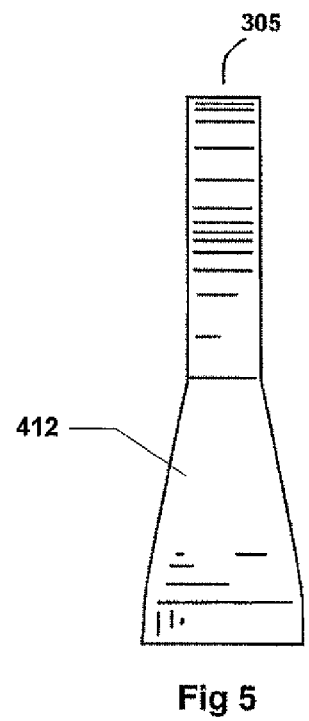
FIG. 5 is a side view of an exemplary fifth wheel mounting bracket.

As shown in FIG. 5, the preferred embodiment of the present invention is between 2 and 6 inches wide and tapers from the generally pyramidal base portion 412 toward the apex. The saddle bearing of the hitch plate may be modified to fit the dimensions of the mounting bracket to ensure the load is transferred through the mounting pin.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

As described above and shown in the associated drawings, the present invention comprises an apparatus for a fifth wheel mounting bracket. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

We claim:

1. A fifth wheel mounting bracket comprising:
   a. a base portion, said base portion comprising a generally pyramidal solid having an apex, and a longitudinal axis;
   b. a generally cylindrical portion disposed at the apex of said base portion having an axis perpendicular to said longitudinal axis, said generally cylindrical portion defining a bore therethrough disposed parallel to said perpendicular axis; and
   c. a friction reducing means disposed in said bore.

2. The fifth wheel mounting bracket of claim 1 wherein said base portion is tapered towards said cylindrical portion.

3. A fifth wheel assembly comprising:
   a. a mounting bracket comprising a base portion, said base portion comprising a generally pyramidal solid having an apex and a longitudinal axis; a generally cylindrical portion disposed at the apex of said base portion having an axis perpendicular to said longitudinal axis, said generally cylindrical portion defining a bore disposed parallel to said perpendicular axis; and a friction reducing means disposed in said bore;
   b. a hitch plate comprising a saddle bearing for receiving said cylindrical portion, and a mounting pin hole; and
   c. a mounting pin;
   wherein forces placed upon said hitch plate are transferred to said base portion through the mounting pin.

4. The fifth wheel mounting bracket of claim 3 wherein said base portion is tapered towards said cylindrical portion.

* * * * *